US009122496B1

(12) United States Patent
Jhoney et al.

(10) Patent No.: US 9,122,496 B1
(45) Date of Patent: Sep. 1, 2015

(54) INTEGRATED HELP SYSTEM USING LINKED DATA FOR DISTRIBUTED SYSTEMS

(71) Applicant: International Business Machines Corporation, Armonk, NY (US)

(72) Inventors: Albee Jhoney, Bangalore (IN); Christopher V. Lazzaro, Austin, TX (US); Arun Ramakrishnan, Chennai (IN); Rohit Shetty, Bangalore (IN); Nalini Vidapankal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/332,648

(22) Filed: Jul. 16, 2014

(51) Int. Cl.
*G06F 9/44* (2006.01)
(52) U.S. Cl.
CPC .............. *G06F 9/4446* (2013.01); *G06F 8/73* (2013.01)
(58) Field of Classification Search
CPC ..................................................... G06F 9/4446
USPC ................. 717/100–103, 120–123, 174–178
See application file for complete search history.

(56) References Cited

U.S. PATENT DOCUMENTS

| 5,155,806 | A  | * | 10/1992 | Hoeber et al. ................ 715/711 |
| 5,361,361 | A  |   | 11/1994 | Hickman et al. |
| 5,535,323 | A  |   | 7/1996  | Miller et al. |
| 6,307,544 | B1 | * | 10/2001 | Harding ........................ 715/709 |
| 7,158,965 | B1 | * | 1/2007  | Greenberg et al. .............. 707/3 |
| 7,624,394 | B1 | * | 11/2009 | Christopher, Jr. ............ 717/177 |
| 7,849,405 | B1 |   | 12/2010 | Coletta et al. |
| 7,886,227 | B2 |   | 2/2011  | Aggarwal et al. |
| 7,907,966 | B1 | * | 3/2011  | Mammen ....................... 455/557 |
| 8,996,471 | B2 | * | 3/2015  | Greenberg et al. ........... 707/687 |
| 2013/0097498 | A1 |  | 4/2013  | Steinberg et al. |

FOREIGN PATENT DOCUMENTS

WO      WO2007070335      6/2007

OTHER PUBLICATIONS

IBM et al., "Method for Allowing Original Equipment Manufacturer DOS Setting Descriptions and Contextual Help," Oct. 1, 1995, TBD v38 n10, pp. 141-146, published by ip.com as IPCOM000116597D on Mar. 30, 2005, 7 pages.
Anonymous, "Method for Communicating Precision and Availability of Contextual Help in User Interfaces," ip.com,, IPCOM000228903D, Jul. 11, 2013, 7 pages.

(Continued)

*Primary Examiner* — Ted T Vo
(74) *Attorney, Agent, or Firm* — VanLeeuwen & VanLeeuwen; Diana R. Gerhardt

(57) ABSTRACT

An approach is provided for providing cross product contextual help consolidating cross product contextual help. The approach is responsive to receiving a help request. The help request pertains to a first software product installed on the information handling system. The first software product interacts with a second software product that is also installed on the information handling system. The approach retrieves a first help contents from the first software product and a value from the second software product. The value is retrieved from the second software product using interfaces that were registered in a registry and uses linked data. Help information is presented to a user with the help information pertaining to the first application and including the first help contents retrieved from the first application and the value retrieved from the second application.

20 Claims, 9 Drawing Sheets

(56) References Cited

OTHER PUBLICATIONS

"Context-sensitive help," Wikipedia, Mar. 14, 2013, 1 page.
"Tooltip," Wikipedia, Jan. 3, 2014, 2 pages.
Jhoney et al, "Consolidating Cross Product Contextual Help," U.S. Patent Application filed Jul. 16, 2014, 40 pages.

* cited by examiner

INTEGRATED HELP SYSTEM USING LINKED DATA FOR DISTRIBUTED SYSTEMS

BACKGROUND OF THE INVENTION

Complex IT environments contain numerous products and applications that work in a delicate harmony. Administration and configuration of these systems needs to be managed on these products as well as between numerous products. Integrations between products depend on individual configurations and can easily be broken by incorrect settings or uncoordinated administration. Traditional systems do not provide centralized assistance and/or help in the context of a distributed IT environment. Instead, the administrator visits each of the individual product help systems to view help content. Additionally, the administrator needs to know the system environment in detail since the help provided, though descriptive, lacks details specific to a customer's environment. These issues result in the customer, or system administrator, making mistakes while configuring the environment even though the help content is descriptive. Managing and administering an IT solution involves numerous products and is a challenge to customers, services teams and managed environment teams. System integration involves configuring between systems. Reviewing disparate documentation and help systems slows down work and can lead to mistakes. These issues affect the ease of use for products and solutions and negatively impact perceived value, cost of ownership, and the like.

SUMMARY

An approach is provided for providing cross product contextual help consolidating cross product contextual help. The approach is responsive to receiving a help request. The help request pertains to a first software product installed on the information handling system. The first software product interacts with a second software product that is also installed on the information handling system. The approach retrieves a first help contents from the first software product and a value from the second software product. The value is retrieved from the second software product using interfaces that were registered in a registry and uses linked data. Help information is presented to a user with the help information pertaining to the first application and including the first help contents retrieved from the first application and the value retrieved from the second application.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
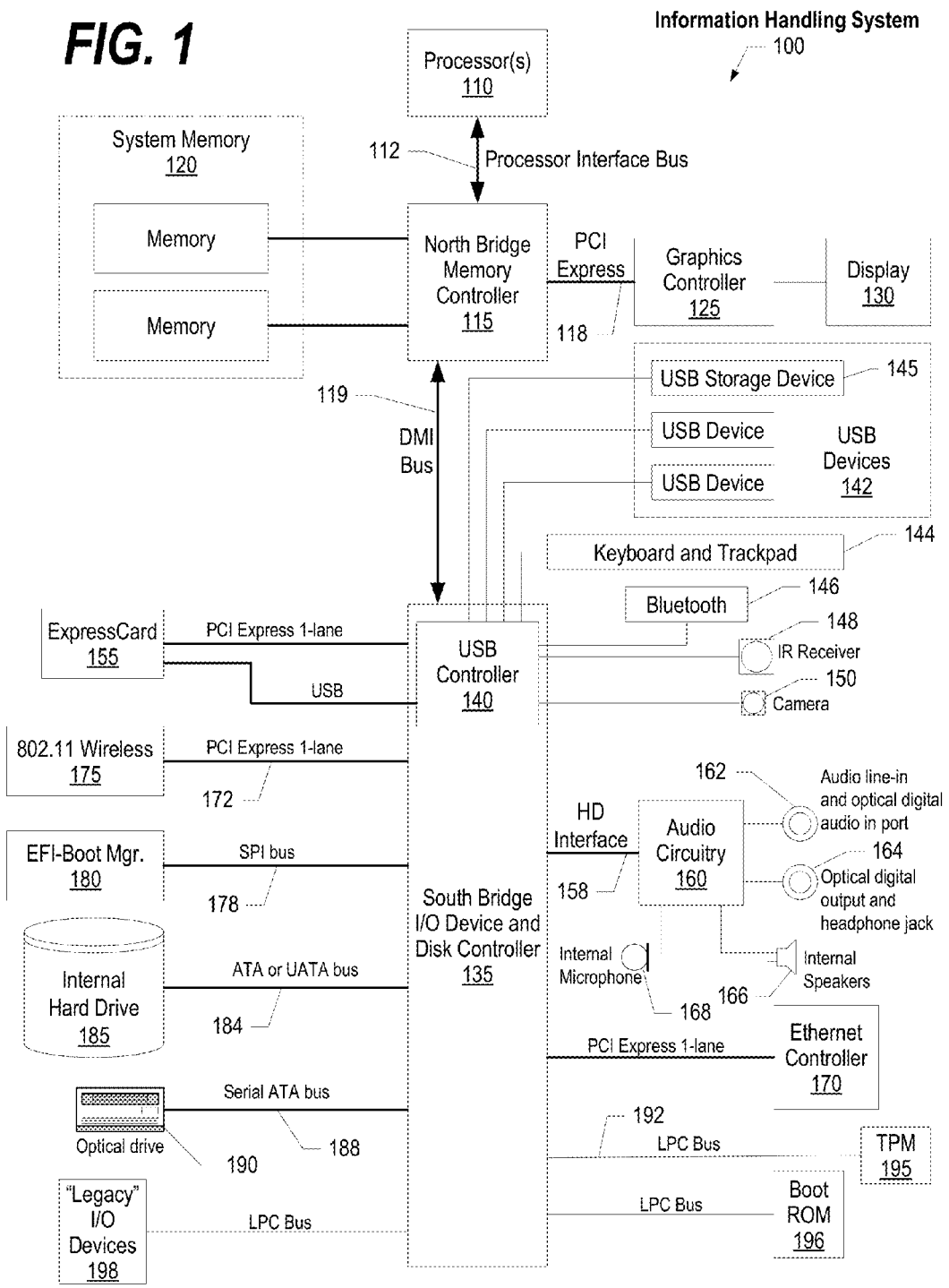
FIG. 1 depicts a block diagram of a processor and components of an information handling system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
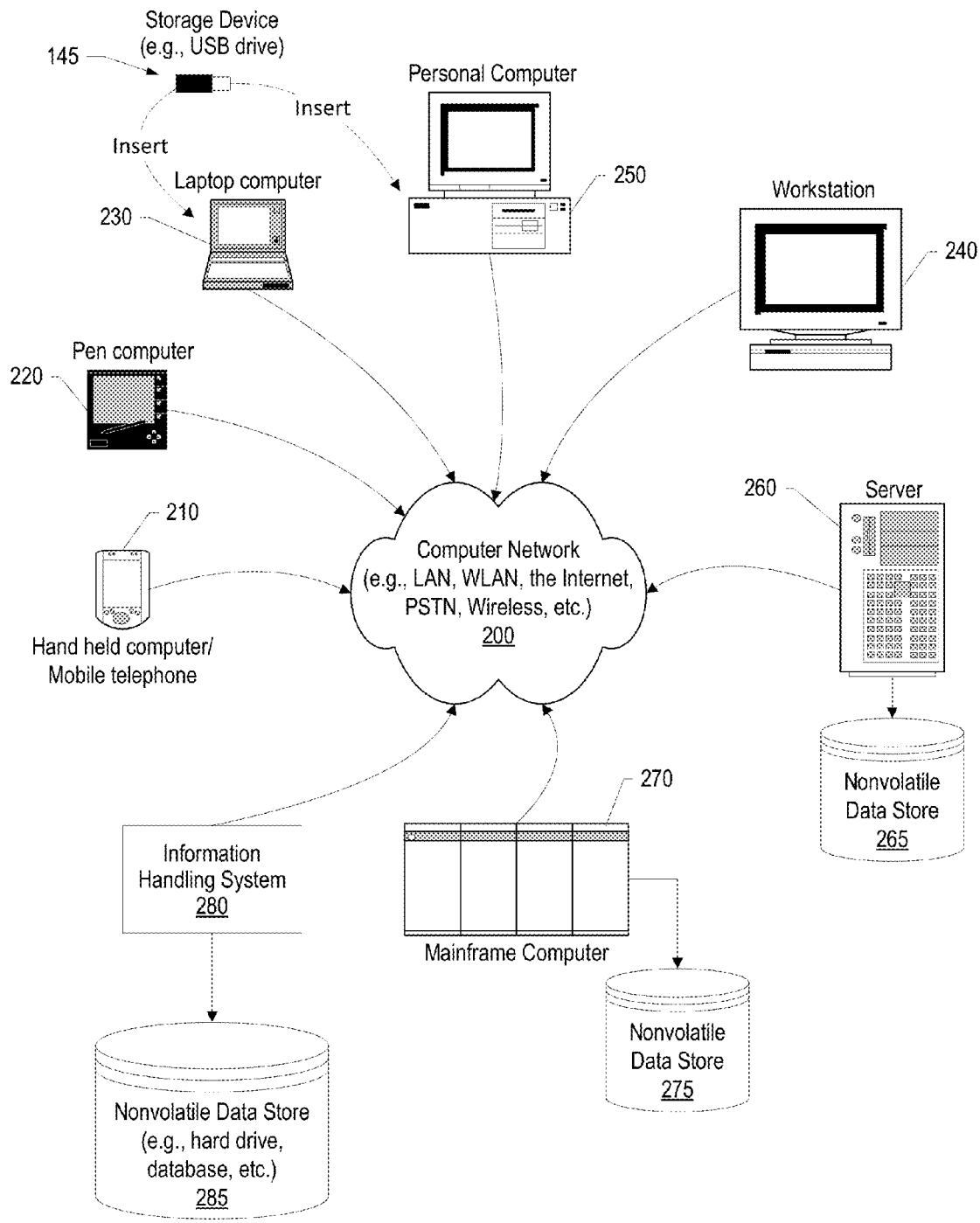
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280.

As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-9 depict an approach that can be executed on an information handling system, to integrate and link help data between a number of installed products. In the approach, OSLO and Linked Data concepts along with a centralized registry support the linking and in-context presentation of help content. Products expose their configuration through an remotely accessible interface (e.g., a REST service, etc.). In an alternate embodiment, a third party product/component or user provides the interface for a product, such as a façade. Products advertise their interfaces by registering them in a central registry. In an alternate embodiment, a third party product/component or user registers the interface and data into the central registry. Products advertise integrations with other components and products through configurations and linked data. In an alternate embodiment, a third party product/component or user register the integrations and data into the central registry. Help files are annotated with content that are related to the product environment or configuration during development. When help is accessed, the help system uses a "context provider" that accesses the central registry to locate the various product interfaces and relationships. The help system analyzes the integrations/topology and the context provider retrieves configurations. The context provider updates the help content annotations with actual values that were retrieved pertaining to the particular customer environment. The help system serves the help content to a user. Help context integration assists an administrator by presenting the state of various products/applications in context along with help content. The cross product help context integration is useful in managing system integrations.

Figure 3:
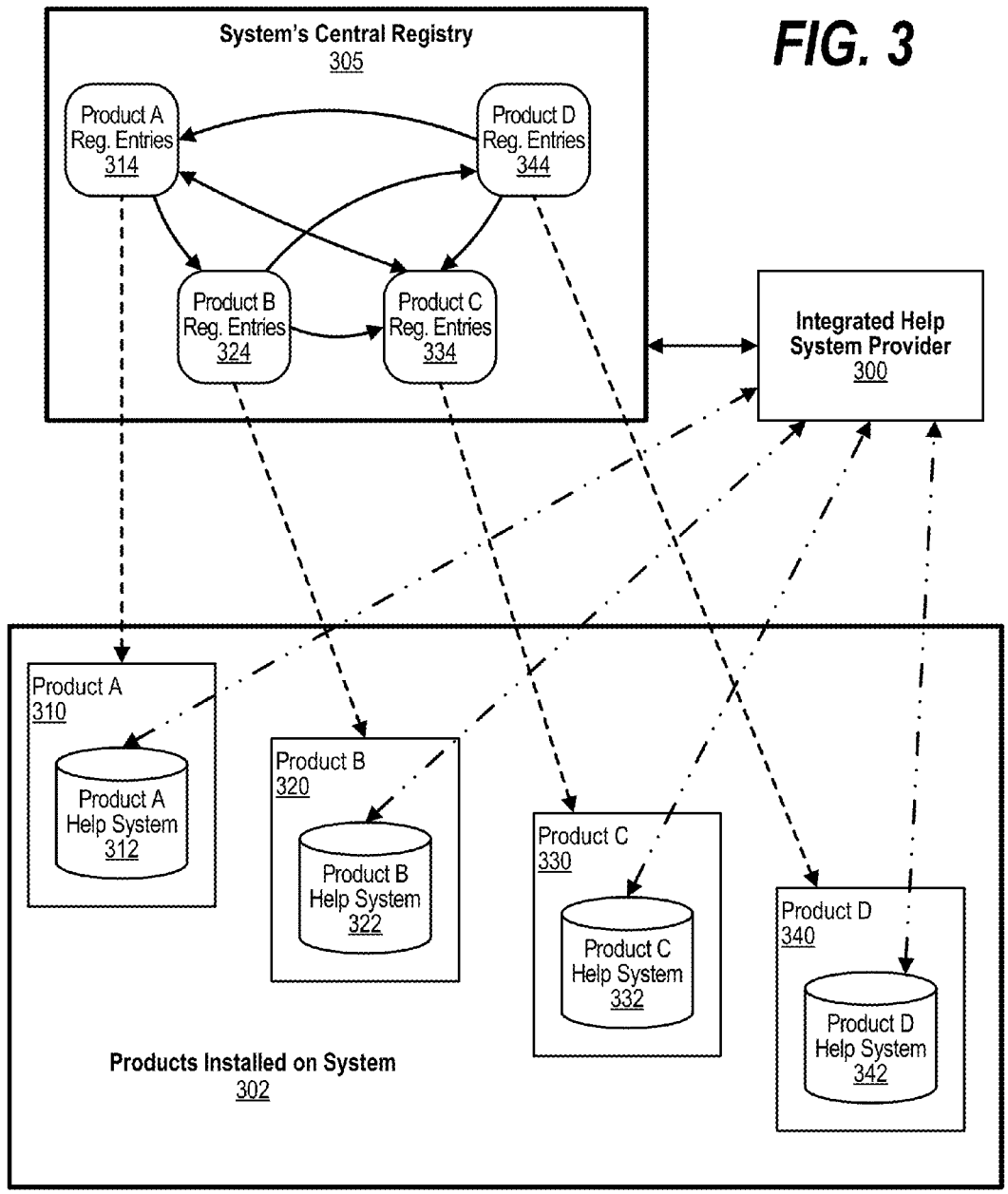
FIG. 3 is a component diagram depicting the various components used in consolidating cross product contextual help.

FIG. 3 is a component diagram depicting the various components used in consolidating cross product contextual help. Four software products are depicted as being installed on an information handling system (Products A, B, C, and D). Each product is installed on information handling system 302. Information handling system 302 may be a single system, or may be a distributed system with disparate systems connected via a computer network, such as computer network 200 shown in FIG. 2. Central registry 305 is used for the various software products to register their respective software services and their relationships with one another. In a distributed environment, central registry 305 may reside on one of the disparate systems with the other systems accessing the central registry remotely, or the central registry can be duplicated on each of the disparate systems so that each system has a copy of the central registry locally accessible.

During installation, each of the software products register themselves and their relationships with central registry 305 to advertise their services. Each of the installed software products includes a help system that is integrated by Integrated Help System Provider 300. In the example shown, Product A is installed (310) along with Product A's help system 312, Product B is installed (320) along with Product B's help system 322, Product C is installed (330) along with Product C's help system 332, and Product D is installed (340) along with Product D's help system 342. In one embodiment, one of the services registered by each of the products is their respective help systems.

During registration of the respective products, the services registered in central registry are advertised, via the central registry, to the other software products as well as to Integrated Help System Provider 300. Entries are shown that correspond to each of the installed software products. Product A registry entries 314 advertise the services provided by Product A including Product A's help system 312. Likewise, Product B registry entries 324 advertise the services provided by Product B including Product B's help system 322. Product C registry entries 334 advertise the services provided by Product C including Product C's help system 332. Likewise, Product D registry entries 344 advertise the services provided by Product D as well as Product D's help system 342. In addition, as depicted by the lines connecting different software products' registry entries, each of the software products has relationships to one or more other software products. In the example, Product A has registered a relationship to Products B and C, Product B has registered a relationship to Products C and D, Product C has registered a relationship to Product A, and Product D has registered a relationship to Products A and C.

When a user, such as a system administrator, requests help from Integrated Help System Provider 300, the Integrated Help System Provider opens a help system interface to search for assistance in administration, configuration etc. The Integrated Help System Provider queries central registry 305 to locate services registered by various products (Products A, B, C, and D). The Integrated Help System Provider contacts each product service directly to retrieve the help contents from help systems 312, 322, 332, and 342. Integrated Help System Provider retrieves the help contents and consolidates the help contents. Integrated Help System Provider then serves the consolidated help to the user. The user selects a help page to view its contents and the Integrated Help System Provider contacts the selected product directly to retrieve the requested help contents. The Integrated Help System Provider then serves the requested product help contents to the user.

Figure 4:
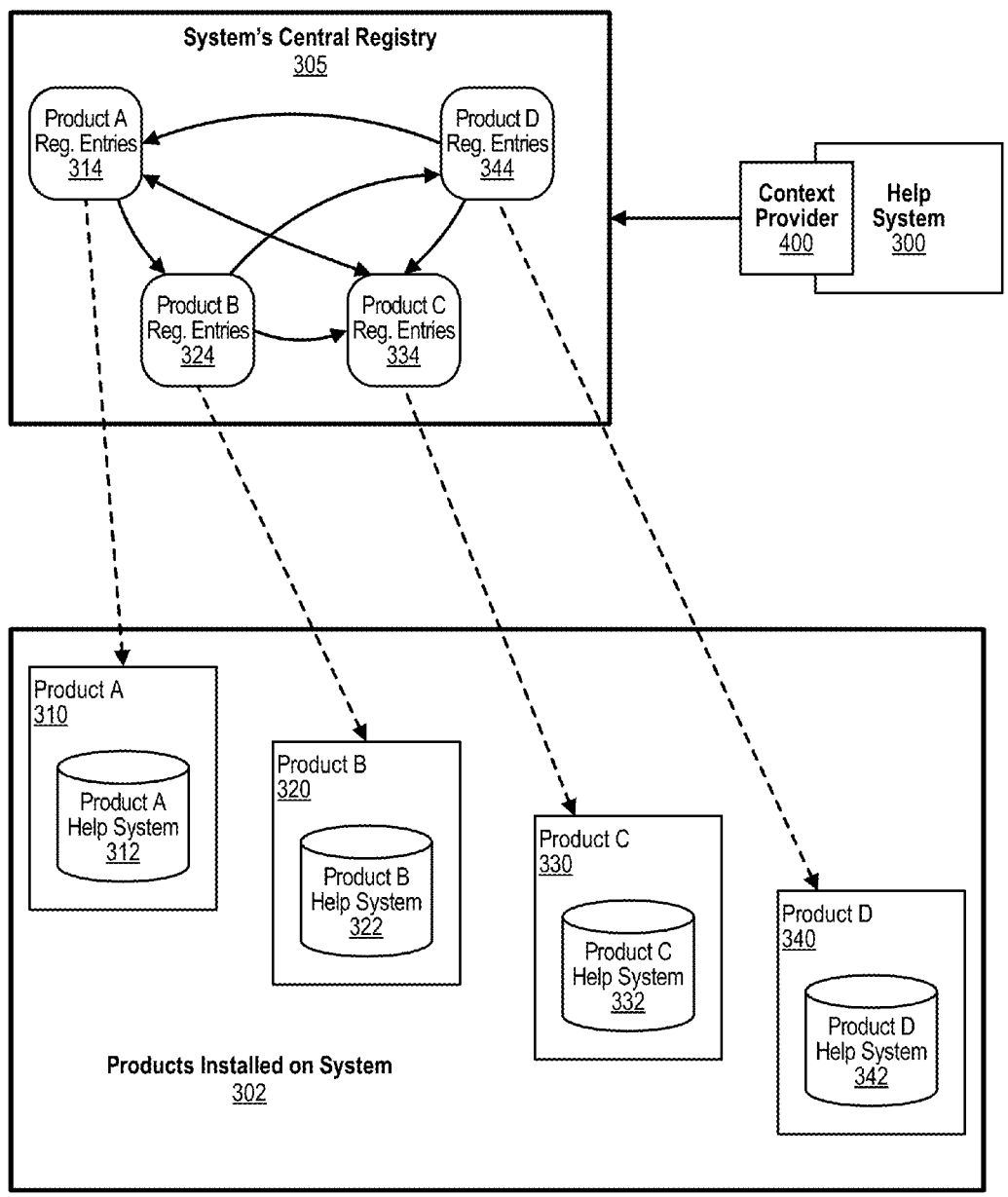
FIG. 4 is a component diagram depicting the various components used in cross product context integration.

FIG. 4 is a component diagram depicting the various components used in cross product context integration. Installation of Products A through D and registration of services and relationships is performed as described above with respect to FIG. 3. When a user, such as a system administrator, requests help from Integrated Help System Provider 300, the Integrated Help System Provider opens a help system interface to search for assistance in administration, configuration etc.

Context provider 400 works in conjunction with Integrated Help System Provider 300. In one embodiment, context provider 400 is integrated with Integrated Help System Provider 300. Context provider 400 identifies the help files requested by the user and reads the contents (e.g., text, annotations in HTML, data tags, etc.) by reading it the help contents. Context provider 400 queries central registry 305 to locate services registered by the various products. Context provider 400 contacts each product service directly to retrieve the information (e.g., values, etc.) that enrich the help content with actual values and data. The context provider then replaces the data tags (e.g., HTML annotations, etc.) in the help files with the actual values retrieved from the system environment, such as from other products installed on system 302. The enriched help is served to the user.

Figure 5:
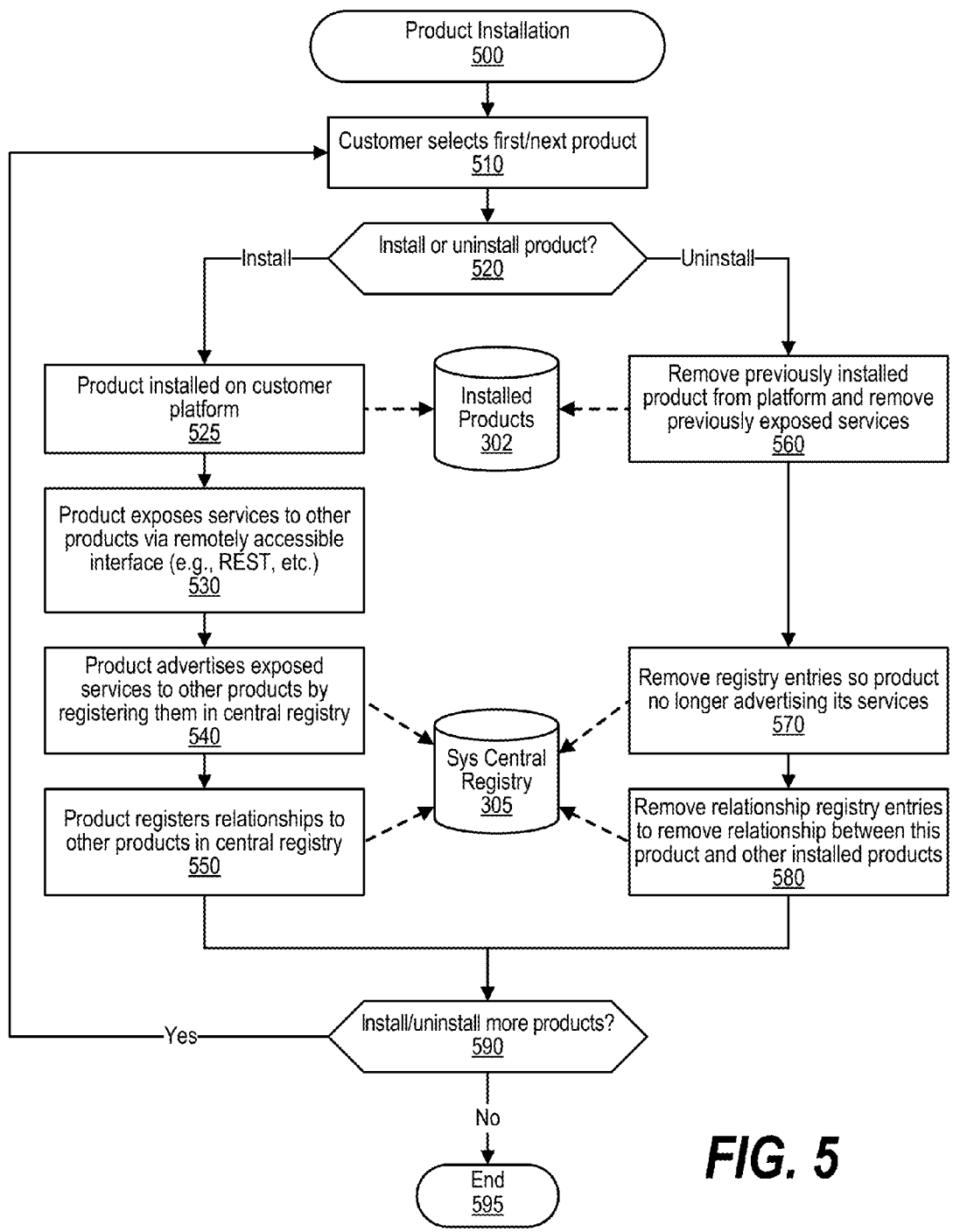
FIG. 5 is a depiction of a flowchart showing the logic performed during product installation to populate a central registry that is used in both consolidating cross product contextual help and cross product context integration.

FIG. 5 is a depiction of a flowchart showing the logic performed during product installation to populate a central registry that is used in both consolidating cross product contextual help and cross product context integration. Processing commences at 500 whereupon, at step 510, the customer selects the first software product. The process determines as to whether the user is installing the selected software product or uninstalling the selected software product (decision 520). If the customer is installing the selected software product, then decision 520 branches to the "install" branch to perform installation steps 525 through 550.

At step 525, the process installs the selected software product on the customer's platform and the selected software product is added to the customer's base of installed products (data store 302). As previously described, the customer's platform may be a single system or a distributed system that includes any number of individual information handling systems connected via a computer network. At step 530, the installed software product exposes its services to other products via a remotely accessible interface, such as a Representational State Transfer (REST) API, etc. At step 540, the process registers the exposed services of the installed software product in central registry 305. By registering the exposed services in the central registry, the installed software product "advertises" the services that it provides to other software products. At step 550, the process identifies other software products already installed on the customer's platform (using the central registry) and registers relationships between the selected software product and other software products in central registry 305.

Returning to decision 520, if the customer is uninstalling a software product from the system, decision 520 branches to the "uninstall" branch whereupon steps 560 through 580 are performed to uninstall the selected software product. At step 560, the process removes the selected software product from the customer's platform and the selected software product is removed from the customer's base of installed products (data store 302). At step 570, the process removes registry entries previously added to central registry 305 when the selected software product was installed on the customer's platform. In this manner, the selected software product's services are no longer advertised to other software products running on the customer's platform. At step 580, the process removes relationship entries between the selected software product and other products installed on the customer's platform.

The process determines as to whether the customer wishes to install or uninstall any more software products (decision 590). If the customer wishes to install or uninstall more software products, then decision 590 branches to the "yes" branch which loops back to receive and process the next software product selected by the customer. This looping continues until the customer no longer wishes to install or uninstall software products on the customer's platform, at which point decision 590 branches to the "no" branch and installation processing ends at 595.

Figure 6:
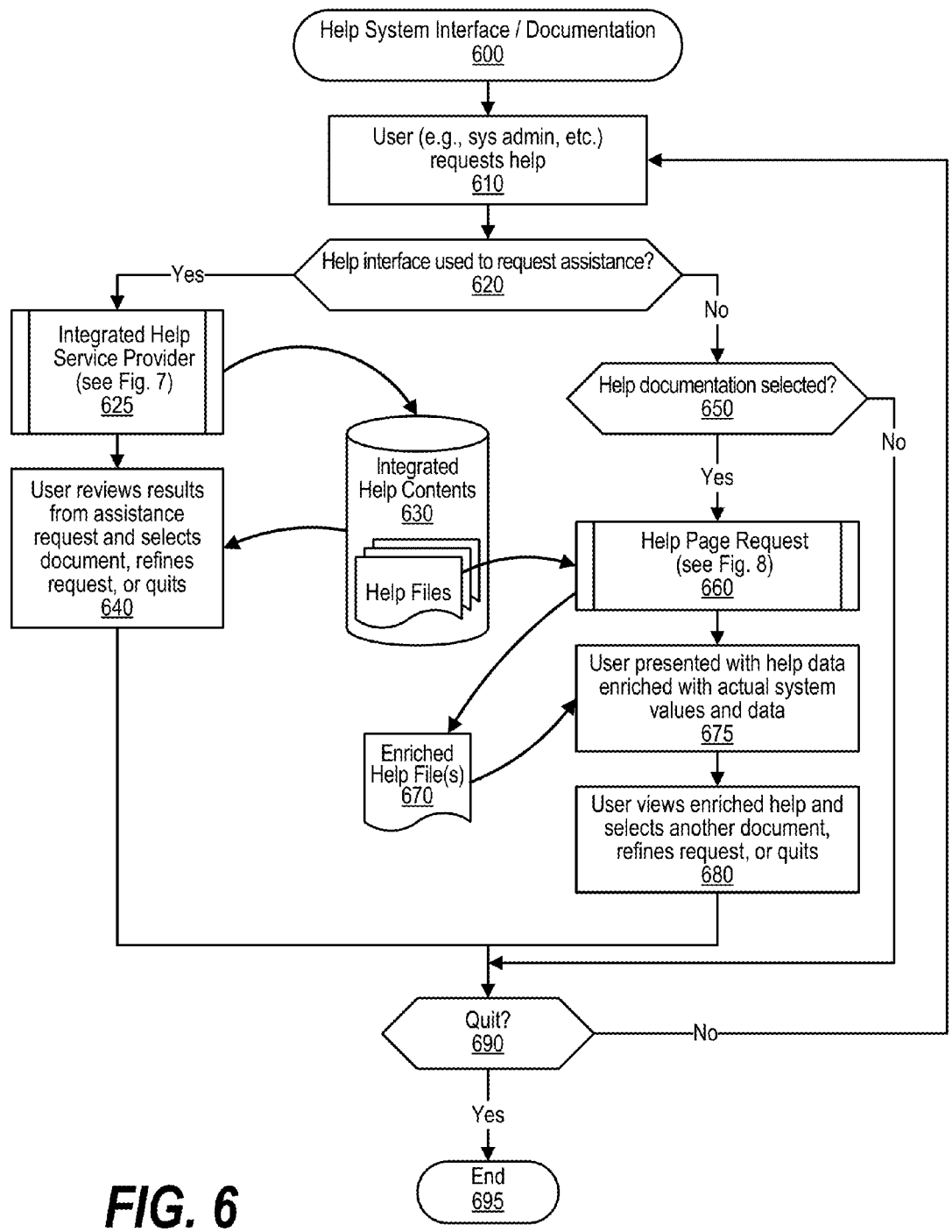
FIG. 6 is a depiction of a high level flowchart showing the logic performed by the integrated help system interface.

FIG. 6 is a depiction of a high level flowchart showing the logic performed by the integrated help system interface. Processing commences at 600 whereupon, at step 610, the process receives a help request from a user, such as a system administrator, of the system. The process determines as to whether the user used the Integrated Help System Provider help interface to request assistance (decision 620). If the Integrated Help System Provider help interface was used to request help, then decision 620 branches to the "yes" branch to execute predefined process 625 whereupon the Integrated Help System Provider identifies the software services installed on the information handling system by the various software products and the relationships between the software products from the central registry, retrieves help contents data from the software products, and generates consolidated help contents 630 from the help contents data retrieved from the software products. The generated consolidated help contents includes a topology that is based on the relationships between the software products (see FIG. 7 and corresponding text for further processing details regarding the Integrated Help System Provider process). For example, integrated consolidated help contents 630 may be a consolidated table of contents for all of the products (e.g., Products A, B, C, and D) currently installed on the customer's system. The processing shown in FIG. 7 discovers the topography of the system by querying each of the products via the central registry. In this manner, after analyzing the software products installed at the customer's system, predefined process 625 generates a topographic view of the help available at the system based on the individual software products currently installed on the system. As software products are installed (added) and uninstalled (deleted), the topographic view of the system changes and such changes are reflected in the resulting integrated help contents 630. At step 640, the process receives a selection from the user pertaining to the consolidated help contents. The request might be a selection of a help document, a refined request, or to terminate the help session.

Returning to decision 620, if the Integrated Help System Provider help interface was not used by the user to request assistance, instead the request was based on a consolidated help contents already displayed to the user, then decision 620 branches to the "no" branch to process the user's request. The process determines as to whether the user selected help documentation from the consolidated help contents, or from another source of help content information (decision 650). If the user selected help documentation, then decision 650 branches to the "yes" branch to further process the user's documentation selection. At predefined process 660, the process handles the help page requested by the user (see FIG. 8 and corresponding text for further processing details). At predefined process 660, responsive to receiving a help request pertaining to a first software product installed on the system, the process detects that the first software product interacts with a second software product based upon relationship entries in the central registry. Help contents from the first software product are retrieved as well as from other software products if the requested help page is formed from a consolidation of multiple software product help contents. The retrieved help contents may reference, via data tags, values available from the second software product. These referenced values are received from the second software product through interfaces registered in the central registry using linked data. Enriched help document 670 is the result of predefined process 660. At step 675, the process presents help information pertaining to the first application (enriched help document 670), with the presented help information including the help contents retrieved from the first software programs (and other software programs if applicable) and any values retrieved from other software programs. At step 680, the process receives another request from the user, such as a selection of another document referenced in the presented help or the consolidated help contents.

The process determines as to whether the user has requested to quit the help system interface process (decision 690). If the user has not requested to quit, then decision 690 branches to the "no" branch which loops back to process the user's next selection as described above. This looping continues until the user requests to quit, at which point decision 690 branches to the "yes" branch and processing ends at 695.

Figure 7:
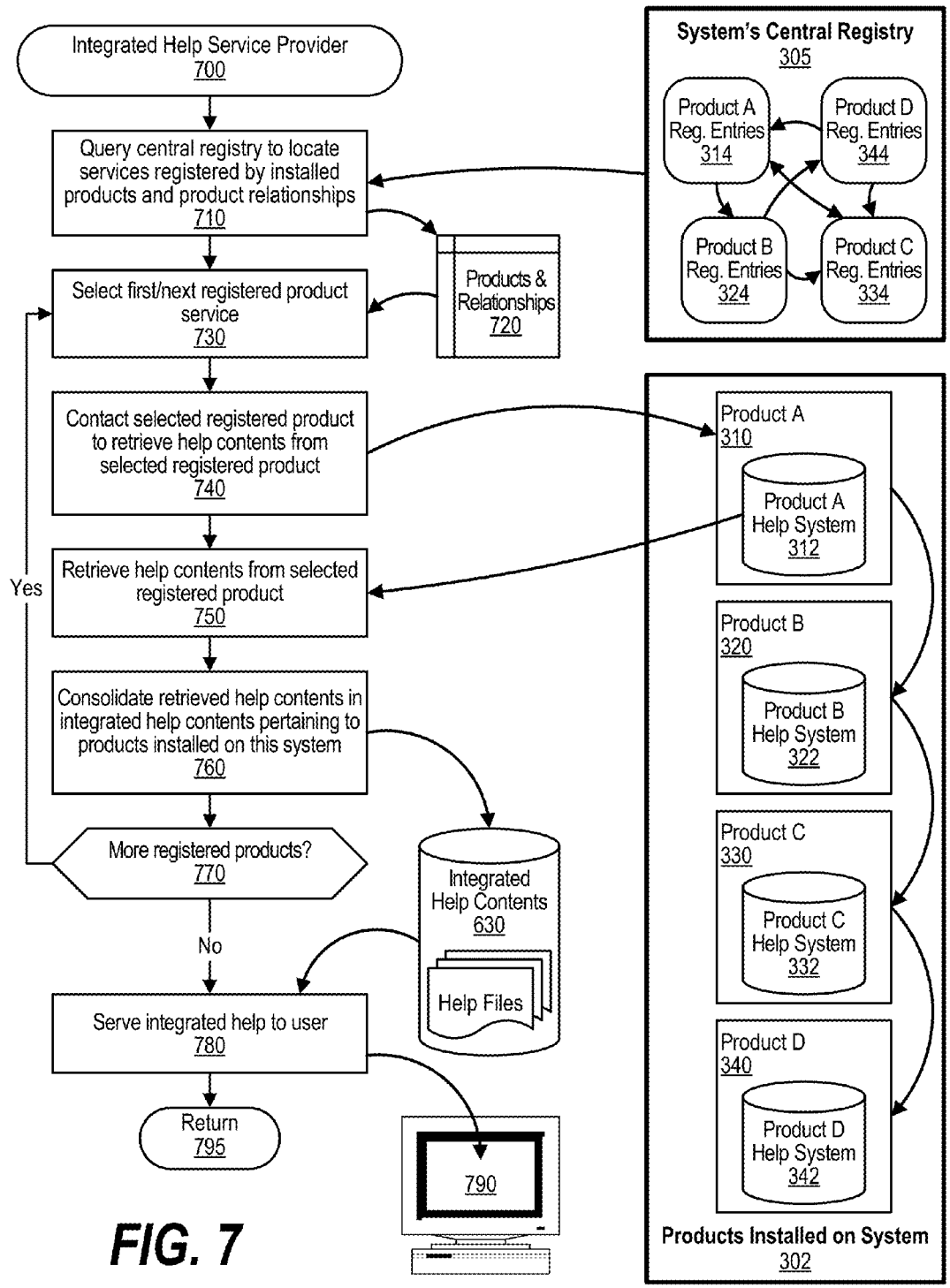
FIG. 7 is a depiction of a flowchart showing the logic performed by the integrated help service provider.

FIG. 7 is a depiction of a flowchart showing the logic performed by the integrated help service provider. Processing commences at 700 whereupon, at step 710, the process queries central registry 305 to locate services registered by the installed processes as well as product relationships between the various installed software products. These products and relationships are stored in memory area 720. At step 730, the process selects the first service pertaining to the first selected software product. At step 740, the process contacts the first software product (e.g., Product A, etc.) directly to retrieve help content data from the software product. At step 750, the process retrieves the help content data from the selected software product. At step 760, the process consolidates the retrieved help content data from the selected software product in consolidated help contents 630.

The process determines as to whether there are more registered software products installed on the system (decision 770). If there are more software products installed on the system, then decision 770 branches to the "yes" branch which loops back to select and retrieve help contents data from the next selected software product. This looping continues until the process has completed generating consolidated help contents 630 from the help contents retrieved from the various software products, at which point decision 770 branches to the "no" branch. The consolidated help contents includes a topology of the relationships between the software products with such relationships being revealed based on the relationships between software products that was retrieved from central registry 305.

At step 780, the process serves the consolidated help contents with topology to a user of the system, for example by displaying the consolidated help contents on display device 790 that is used by the user. Processing then returns to the calling routine (see FIG. 6) at 795.

Figure 8:
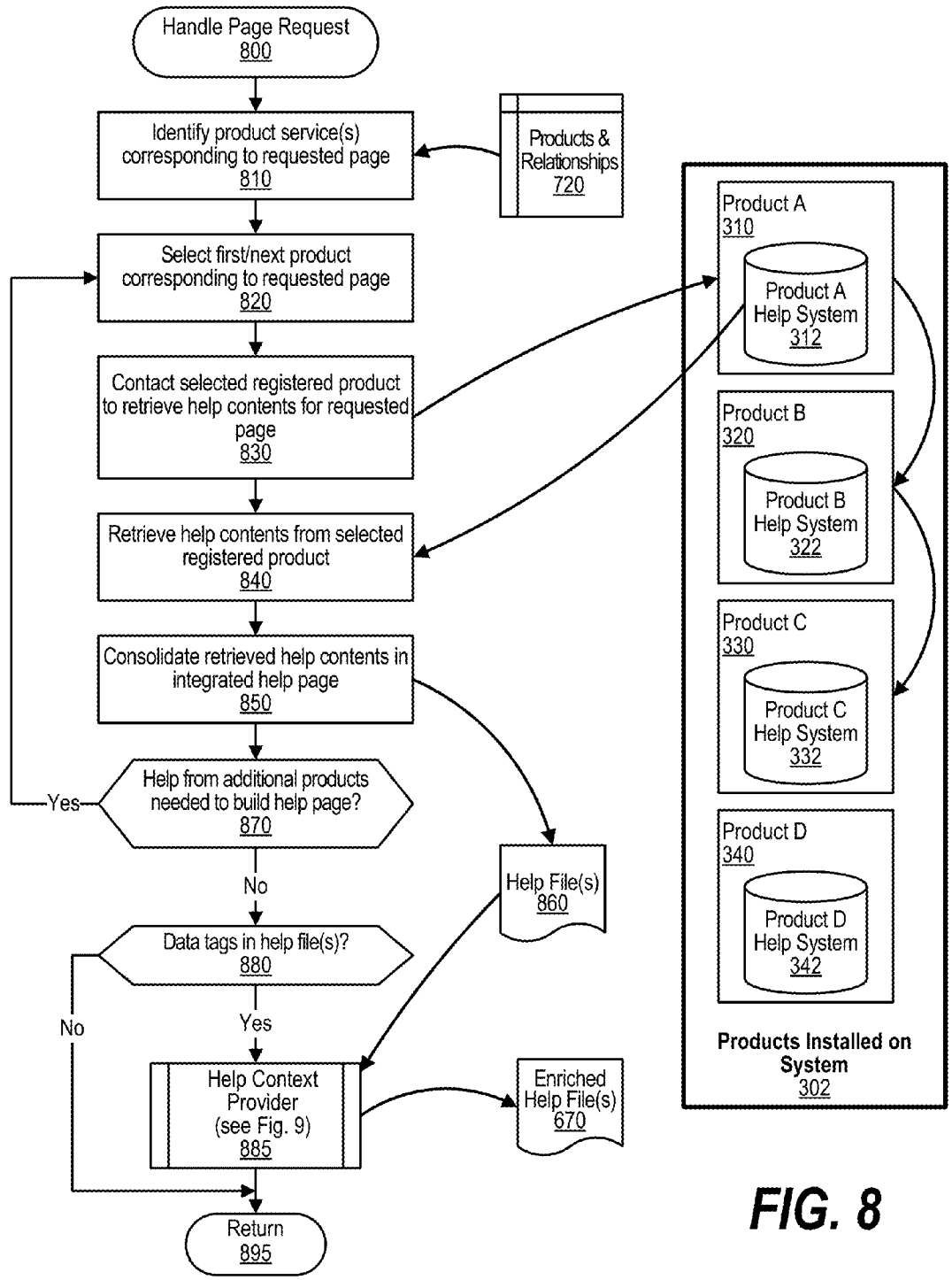
FIG. 8 is a depiction of a flowchart showing the logic performed to handle a help page retrieval request.

FIG. 8 is a depiction of a flowchart showing the logic performed to handle a help page retrieval request. Processing commences at 800 whereupon, at step 810, the process identifies product services corresponding to the requested help page. The identification of the product services is based upon the services that each software product registered in the central registry. This registration data as previously queried and stored in memory area 720.

At step 820, the process selects the first software product that corresponds to the requested help page. At step 830, the process contacts the software product directly (e.g., Product A, etc.) to retrieve the help contents for the requested help page from the software product. At step 840, the process retrieves the requested help contents from the registered software product. At step 850, the process consolidates the retrieved help contents in an integrated help page document (document 860). The process determines as to whether help contents data from other registered software products is needed to build the requested help page (decision 870). If help contents data from additional software products is needed to build the requested help page, then decision 870 branches to the "yes" branch whereupon processing loops back to select and process help contents data from the next software product that correspond to the requested help page with the retrieved help contents data being added to consolidated page document 860. This looping continues until the help contents data needed from all of the software products needed to build the help page have been retrieved and the consolidated help document has been generated, at which point decision 870 branches to the "no" branch for further processing.

The process determines as to whether data tags (e.g., HTML tags, etc.) that reference values available from software products are found in consolidated help document 860 (decision 880). If data tags are found in the consolidated help file, then decision 880 branches to the "yes" branch whereupon, at predefined process 885, the help context provider is called to resolve the software product references (see FIG. 9 and corresponding text for further processing details). The result of the help context provider processing is enriched help files 670 that include not only help contents data from one or more software products, but also values received from one or more software products. In one embodiment, at least one of the software products that provides one of the values does not have its help contents data included in consolidated help files 860. Returning to decision 880, if there are no data tags found in consolidated help document 860, then decision 880 branches to the "no" branch bypassing predefined process 885. Processing then returns to the calling routine (see FIG. 6) at 895.

Figure 9:
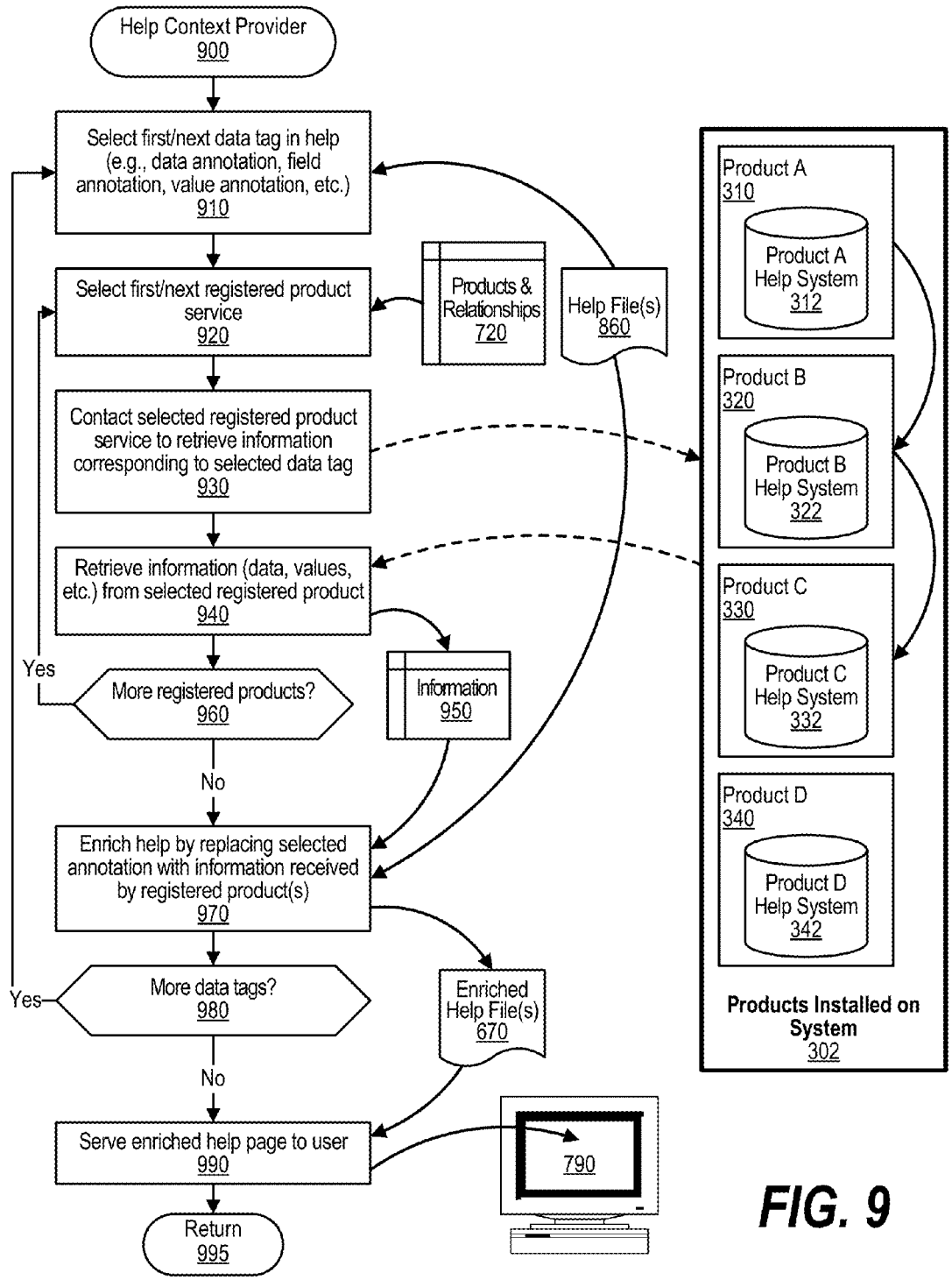
FIG. 9 is a depiction of a flowchart showing the logic performed by the help system's help context provider.

FIG. 9 is a depiction of a flowchart showing the logic performed by the help system's help context provider. Processing commences at 900 whereupon, at step 910, the process selects the first data tag found in the consolidated help contents document 860. The data tag can be a data annotation, such as an HTML tag, a field annotation, a value annotation, and the like. At step 920, the process selects the first registered product service that provides the value corresponding to the selected data tag. The product service is identified via the central registry where the installed software products registered their available services as a way to advertise such services to other software products. At step 930, the process contacts the selected software product service to retrieve information (a value, etc.) corresponding to the selected data tag (e.g. contacting Product A, etc.). At step 940, the responsive information (value(s), etc.) are retrieved from the selected software product. The information is stored in memory area 950.

The process determines as to whether there are more registered products that provide the value corresponding to the selected data tag (decision 960). If other software products provide the value corresponding to the selected data tag, then decision 960 branches to the "yes" branch which loops back to select the next software product that provides the value and the value is retrieved from the next software product as described above. This looping continues until all of the software products that provide the value corresponding to the selected data tag have been processed, at which point decision 960 branches to the "no" branch for further processing.

At step 970, the process enriches the consolidated help contents data by replacing annotations (e.g., the selected data tag, etc.) with values received from the registered software products and stored in memory area 950. Enriched help contents data is stored in document 670. The process determines as to whether there are more data tags in the consolidated help file to process (decision 980). If there are more data tags to process, then decision 980 branches to the "yes" branch which loops back to select and process the next data tag as described above. This looping continues until all of the data tags found in consolidated help file 860 have been processed, at which point decision 980 branches to the "no" branch. At step 990, the process serves enriched help page document 670 to the user, such as on display device 790 that is used by the user. The enriched help page includes the consolidated help data from one or more of the software products as well as actual data values from one or more software products that have been inserted in the help document. Processing then returns to the calling routine (see FIG. 8) at 995.

The following example shows a help file with a data tag followed by the enriched help file where the data tag has been replaced by the actual value received from one of the software products installed on the system. An example of a help file with a data tag is:

The default value is ${APP_INSTALL_ROOT}/cell_name. A directory having the EAR file name of the application being installed is appended to that path. Thus, if you do not specify a directory, the EAR file is installed in the ${APP_INSTALL_ROOT}/cell_name/application_name.ear directory.

In the example, assume the provider of the software product being referenced is "Acme Corp" and the name of the software product is "Product A." In this example, after the data tag is replaced by the actual values, the resulting enriched help page document might be something like:

The default value is C:/Program Files/Acme Corp/Product A/AppServer/profiles/Apps/cell_name. A directory having the EAR file name of the application being installed is appended to that path. Thus, if you do not specify a directory, the EAR file is installed in the C:/Program Files/Acme Corp/Product A/AppServer/profiles/Apps/cell_name/application_name.ear directory.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of providing cross product contextual help, the method comprising:
responsive to receiving a help request pertaining to a first software product installed on the information handling system, wherein the first software product interacts with a second software product that is also installed on the information handling system:
retrieving, by one of the processors, a first help contents from the first software product;

retrieving, by one of the processors, a value from the second software product through interfaces registered in a registry stored in the memory, wherein the retrieving uses linked data; and presenting, by one of the processors, help information pertaining to the first application, wherein the presented help information includes the first help contents retrieved from the first application and the value retrieved from the second application.

2. The method of claim 1 wherein the information handling system comprises a plurality of disparate systems connected via a computer network, wherein the first software product from the plurality of software products is installed on a first of the disparate systems, and a second software product from the plurality of software products is installed on a second of the disparate systems.

3. The method of claim 1 further comprising:
retrieving a second help contents from the second software product, wherein the help information further includes the second help contents.

4. The method of claim 1 further comprising:
identifying a data tag in the first help contents, wherein the value retrieved from the second software product corresponds to the identified data tag.

5. The method of claim 4 further comprising:
prior to receiving the help request, registering, by the second software product, an entry in a registry corresponding to the data tag;
detecting the data tag in the first help contents;
locating the registered entry in the registry that pertains to the detected data tag; and
requesting the value from the second software program based on the located entry in the registry.

6. The method of claim 1 wherein the first help content is annotated with one or more parameters, the method further comprising:
retrieving the value from the second software product based on the annotated first help contents.

7. The method of claim 1 further comprising:
installing the first and the second software products on the information handling system prior to receiving the help request, wherein the installing of each software product includes:
registering the software services pertaining to the software product in the registry, wherein the software services are accessible by external processes using a remotely accessible interface, and wherein one of the software services registered by the second software product corresponds to the value.

8. An information handling system comprising:
one or more processors;
a memory coupled to at least one of the processors;
a first computer product and a second computer product installed in the memory;
a network adapter that connects the information handling system to a computer network; and
a set of instructions stored in the memory and executed by at least one of the processors to provide cross product contextual help, wherein the set of instructions perform actions of:
responsive to receiving a help request pertaining to the first software product installed on the information handling system, wherein the first software product interacts with the second software product that is also installed on the information handling system:
retrieving a first help contents from the first software product;
retrieving a value from the second software product through interfaces registered in a registry using linked data; and
presenting help information pertaining to the first application, wherein the presented help information includes the first help contents retrieved from the first application and the value retrieved from the second application.

9. The information handling system of claim 8 wherein the information handling system comprises a plurality of disparate systems connected via a computer network, wherein the first software product from the plurality of software products is installed on a first of the disparate systems, and a second software product from the plurality of software products is installed on a second of the disparate systems.

10. The information handling system of claim 8 wherein the actions further comprise:
retrieving a second help contents from the second software product, wherein the help information further includes the second help contents.

11. The information handling system of claim 8 wherein the actions further comprise:
identifying a data tag in the first help contents, wherein the value retrieved from the second software product corresponds to the identified data tag.

12. The information handling system of claim 11 wherein the actions further comprise:
prior to receiving the help request, registering, by the second software product, an entry in a registry corresponding to the data tag;
detecting the data tag in the first help contents;
locating the registered entry in the registry that pertains to the detected data tag; and
requesting the value from the second software program based on the located entry in the registry.

13. The information handling system of claim 8 wherein the first help content is annotated with one or more parameters, and wherein the actions further comprise:
retrieving the value from the second software product based on the annotated first help contents.

14. A computer program product stored in a computer readable storage medium, comprising computer instructions that, when executed by an information handling system, causes the information handling system to provide cross product contextual help by performing actions comprising:
responsive to receiving a help request at a computer system with a plurality of software products installed thereon:
responsive to receiving a help request pertaining to a first software product installed on the information handling system, wherein the first software product interacts with a second software product that is also installed on the information handling system:
retrieving a first help contents from the first software product;
retrieving a value from the second software product through interfaces registered in a registry using linked data; and
presenting help information pertaining to the first application, wherein the presented help information includes the first help contents retrieved from the first application and the value retrieved from the second application.

15. The computer program product of claim 14 wherein the information handling system comprises a plurality of disparate systems connected via a computer network, wherein the first software product from the plurality of software products is installed on a first of the disparate systems, and a second software product from the plurality of software products is installed on a second of the disparate systems.

16. The computer program product of claim 14 wherein the actions further comprise:
  retrieving a second help contents from the second software product, wherein the help information further includes the second help contents.

17. The computer program product of claim 14 wherein the actions further comprise:
  identifying a data tag in the first help contents, wherein the value retrieved from the second software product corresponds to the identified data tag.

18. The computer program product of claim 17 wherein the actions further comprise:
  prior to receiving the help request, registering, by the second software product, an entry in a registry corresponding to the data tag;
  detecting the data tag in the first help contents;
  locating the registered entry in the registry that pertains to the detected data tag; and
  requesting the value from the second software program based on the located entry in the registry.

19. The computer program product of claim 14 wherein the first help content is annotated with one or more parameters, and wherein the actions further comprise:
  retrieving the value from the second software product based on the annotated first help contents.

20. The computer program product of claim 14 wherein the actions further comprise:
  installing the first and the second software products on the information handling system prior to receiving the help request, wherein the installing of each software product includes:
  registering the software services pertaining to the software product in the registry, wherein the software services are accessible by external processes using a remotely accessible interface, and wherein one of the software services registered by the second software product corresponds to the value.

\* \* \* \* \*